United States Patent
de la Coliniere et al.

(10) Patent No.: US 11,913,492 B2
(45) Date of Patent: Feb. 27, 2024

(54) UNI-DIRECTIONAL AND MULTI-DIRECTIONAL MECHANICAL STRUCTURAL BEARING

(71) Applicant: MARCONMETALFAB INC., Delta (CA)

(72) Inventors: Eric de Fleuriot de la Coliniere, Langley (CA); Casey Xi Wang, Maple Ridge (CA); Duncan Robert Bohlmann, Vancouver (CA)

(73) Assignee: MARCONMETALFAB INC., Delta (CA)

( * ) Notice: Subject to any disclaimer, the term of this patent is extended or adjusted under 35 U.S.C. 154(b) by 36 days.

(21) Appl. No.: 17/410,215

(22) Filed: Aug. 24, 2021

(65) Prior Publication Data
US 2022/0205475 A1 Jun. 30, 2022

Related U.S. Application Data

(60) Provisional application No. 63/131,521, filed on Dec. 29, 2020.

(51) Int. Cl.
*E02D 35/00* (2006.01)
*F16C 11/04* (2006.01)
*E04B 1/38* (2006.01)

(52) U.S. Cl.
CPC .............. *F16C 11/04* (2013.01); *E04B 1/388* (2023.08)

(58) Field of Classification Search
CPC ......... F16C 29/02; E01D 19/047; E04B 1/388
See application file for complete search history.

(56) References Cited

U.S. PATENT DOCUMENTS

| | | | | |
|---|---|---|---|---|
| 3,508,797 A | * | 4/1970 | Marsh | E01D 19/047 384/36 |
| 3,703,014 A | * | 11/1972 | Koester | E01D 19/047 14/73.5 |
| 3,728,752 A | * | 4/1973 | Andra | E01D 19/04 14/73.5 |
| 3,782,788 A | * | 1/1974 | Koester | E01D 19/041 14/73.5 |
| 3,806,975 A | * | 4/1974 | Fyfe | E01D 19/047 384/276 |
| 3,921,240 A | * | 11/1975 | Fyfe | E04B 1/36 14/73.5 |

(Continued)

OTHER PUBLICATIONS

Moriaki, M. et al., "Analysis and repair of sliding material in large movable bearings for long-span bridges, " Aug. 2015, 10 pages [Retrieved on Dec. 5, 2023] Retrieved from the Internet: https://www.researchgate.net/publication/330350132.

*Primary Examiner* — Basil S Katcheves
(74) *Attorney, Agent, or Firm* — Davis Wright Tremaine LLP; Heather M. Colburn

(57) ABSTRACT

A uni-directional and multi-directional mechanical bearing suitable for supporting structures such as bridges comprises a removable cassette comprising a sliding layer composed of a low friction material such as PTFE. The removable cassette allows for the replacement of the sliding layer without needing to remove or replace the entire bearing. The bearing can be part of a kit that includes a replacement cassette having a varying thickness that corresponds to the uneven wear on the sliding layer of the removable cassette and compensates for an eccentric pressure on the bearing when under load.

13 Claims, 8 Drawing Sheets

(56) References Cited

U.S. PATENT DOCUMENTS 3,995,915 A * 12/1976 Koster .................. E01D 19/047
   384/36
4,006,505 A *  2/1977 Koster .................... F16H 33/02
   267/141
4,123,815 A * 11/1978 Neff ...................... E01D 19/047
   384/220

* cited by examiner

UNI-DIRECTIONAL AND MULTI-DIRECTIONAL MECHANICAL STRUCTURAL BEARING

FIELD

This disclosure relates generally to uni-directional and multi-directional structural bearings for supporting structures such as bridges.

BACKGROUND

A mechanical bridge bearing is a type of structural bearing that supports and provides free movement and rotation between a superstructure (e.g. bridge deck) and a supporting substructure (e.g. abutments and piers), while ensuring the safe transfer of horizontal and vertical loads. A bridge superstructure rests on the bearing and the bearing allows the deck to move and rotate as needed on top of its supports at abutments and piers. Examples of mechanical bridge bearings include pot, disk and spherical bearings.

Bridge bearings are typically installed on leveling pads so that the bottom side of the bearing is as near to the horizontal as possible so as not to induce eccentricities on the substructure. This is achieved with the aid of leveling devices and by using grout below the bearings located at the bridge abutments or piers. Allowing for construction tolerances, a well-constructed leveling pad for the bearing to sit on will result in the top and bottom plate of the bearing being as close to the horizontal as possible. However, the bridge deck above is very seldom level. The underside of most bridge superstructures has a slight slope in the longitudinal direction (direction of traffic) because of built-in cambers and deflections under load and in the transverse direction from bridge super-elevations, etc., or a combination thereof. A wedge-shaped connector is typically installed or constructed above the bearing to ensure the bearing maintains its level or stays within the designed rotation under permanent loads. In steel girder bridges this is usually provided by a variable depth steel taper plate. In concrete bridges it is usually provided by a variable depth grout pad.

For both uni-directional and multi-directional structural bearings, free movement and transfer of loads typically occur through sliding surfaces which comprise of a low friction material ("sliding layer") such as polytetrafluoroethylene (PTFE) and polished stainless steel. Where guides are required, such as in the case of uni-directional bearings, the sliding surfaces are in both the vertical direction (along the guides) and in the horizontal direction of movements where the majority of the loads are transferred from the superstructure to the substructure of the bridge. A uni-directional bearing typically comprises a guide (central to the bearing) or guides (external to the bearing) to prevent movement only in a direction perpendicular to the guide(s).

The sliding surfaces allow both the top part of the bearing, which is attached to the deck superstructure, and bottom part of the bearing, which is attached to the bridge substructure to slide relative to each other and be directed along a guide or guides for uni-directional bearings only. In the case of a pot or disk bearings, the elastomeric disc allows the top and bottom plates of the bearing to rotate relative to each other.

A problem with conventional mechanical bearings is premature wear of the sliding layer, composed of a low friction material. The sliding layer may need to be replaced well before the end of the design life of the bearing due to premature wear. Such premature wear is typically caused by eccentric pressure on the sliding layer resulting from constraints from within the bearing such as from over-rotation of the piston on the elastomeric disc in pot bearings, which can be introduced when installing the bearing. In pot bearings, for example, the sliding layer is recessed in either the piston or the pot, and usually glued in place. This makes removing only the sliding layer impractical, and in practice, the entire bearing is typically replaced when the sliding layer has worn out. It is not cost effective to replace the entire bearing when only one component is worn out and replacing the entire bearing does not always address the underlying factors which are causing the premature wear.

The premature wear could be the result of a number of causes, for example, an out-of-tolerance install during construction wherein the bearing could, for instance, have been installed such that the base is not perfectly level. Alternatively, the taper plates could have been formed with an incorrect taper, or be installed incorrectly. It is also possible that the piers or abutments are slightly higher or lower than designed resulting in a change of angle at the bearings. Uneven wear could also be caused by a bridge designer error, e.g. incorrectly calculating the slope of the bridge or the slope of the taper plates. Further, uneven wear can be caused by a restraint moment from the elastomer in pot or disk bearings. Pot and disc bearings are designed to accommodate rotation by deformation of the elastomeric disc. When rotation occurs about a horizontal axis, the elastomer compresses on one side of the disc and elongates on the other. This results in what is known as a restoring moment. This moment is generated by the elastomer resisting the deformation. This restoring moment results in an uneven pressure distribution on the above sliding layer. The edge of the sliding layer that corresponds to the elastomer in compression will experience a higher pressure and the opposite edge of the sliding layer will experience a lower pressure. If a bearing experiences rotation predominantly in one direction this will cause accelerated wear on one side of the sliding layer.

It is therefore desirable to provide a solution to at least some of the existing challenges faced by prior art devices.

SUMMARY

Figure 1:
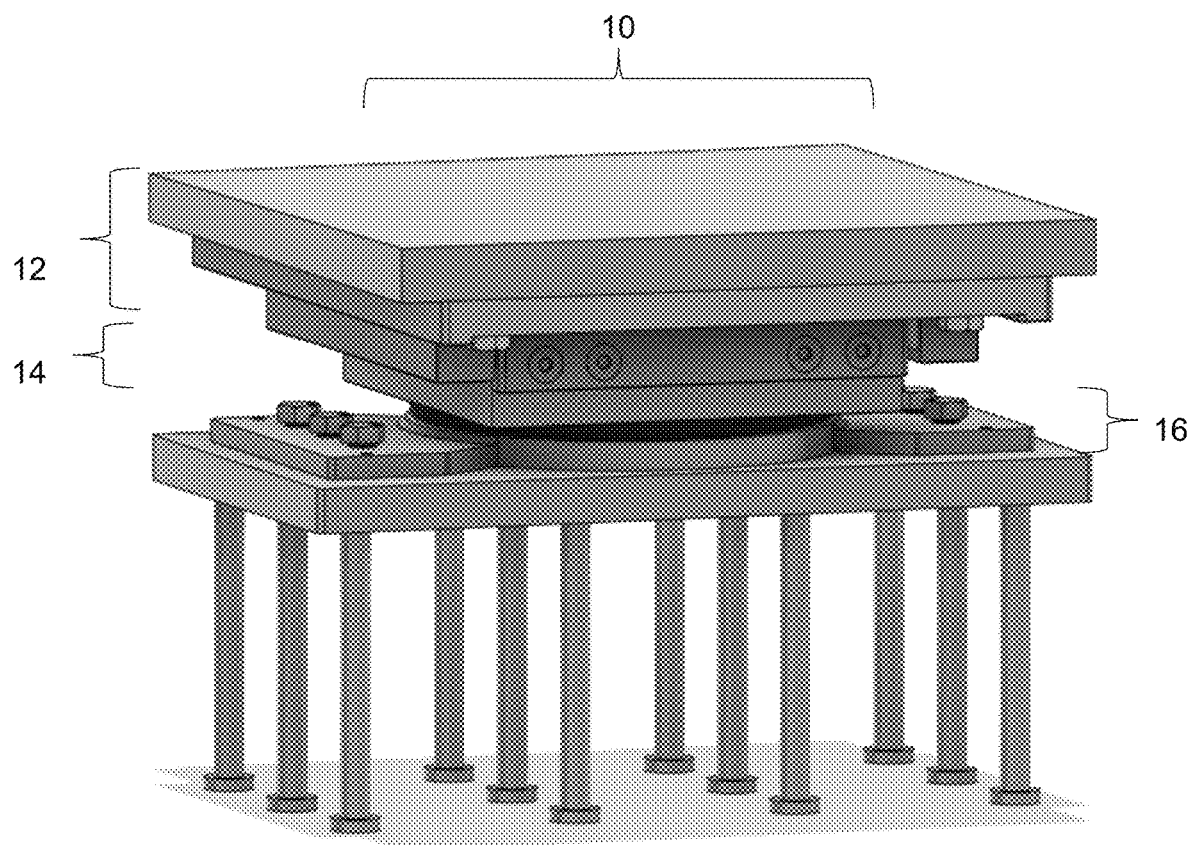
FIG. 1 is a top perspective view of a uni-directional pot bearing according to a first embodiment of the invention.

According to one aspect of the invention, there is provided a bearing apparatus for supporting a structure, comprising: a first assembly having a top surface for supporting a superstructure; a second assembly having a bottom surface mountable on a substructure; and a cassette assembly in between the first and second assemblies. The cassette assembly comprises a cassette housing in contact with a top surface of the second assembly and a cassette removably fastened to the cassette housing. The cassette comprises a backing plate and a sliding layer mounted to the backing plate and in sliding contact with a bottom surface of the first assembly, such that the first assembly is movable relative to the second assembly along the sliding layer. The cassette can be removed and replaced when the sliding layer has prematurely or excessively worn before the design life of the bearing apparatus.

The bearing can be a pot bearing, in which case the first assembly is a top plate assembly comprising at least one guide bar extending in a lateral sliding direction. The cassette housing can be part of a pot plate in sliding contact with the guide bar along a lateral sliding direction, and the second assembly can be a piston plate assembly comprising an elastomeric disc contacting a bottom surface of the pot plate and a piston plate contacting a bottom surface of the elastomeric disc. The piston plate assembly is rotatable about vertical and horizontal axes relative to the cassette assembly by deformation of the elastomeric disc. The pot plate can further comprise a sliding strip in sliding contact with the guide bar. The sliding layer and sliding strip can be composed of polytetrafluoroethylene (PTFE) or another comparable low friction material. The cassette assembly can further comprise two anchor plates which can be attached to ends of the pot plate thereby to secure the cassette in place during service and to allow for removal of the cassette from the apparatus when at least one anchor plate is detached.

Alternatively, the cassette housing can be part of a piston plate, and the second assembly can be a pot plate assembly comprising an elastomeric disc contacting a bottom surface of the piston plate.

A replacement cassette can be provided having a backing plate with a varying thickness across two or more of the corners of the plate. The varying thickness of the backing plate can be designed to correspond to an observed wear in the sliding layer of the original cassette caused by a varying pressure on the sliding layer from an eccentric load or over rotation of the bearing apparatus.

The replacement cassette can be part of a kit comprising the aforementioned bearing apparatus. More particularly, the kit can be a uni-directional pot plate kit, comprising: a top plate assembly comprising a top surface for supporting a superstructure and at least one guide bar extending in a lateral sliding direction; a cassette and pot plate assembly comprising a pot plate in sliding contact with the guide bar along the lateral sliding direction; a first cassette removably fastened to the pot plate and comprising a first backing plate with a constant thickness and a first sliding layer mounted to the first backing plate and in sliding contact with a bottom surface of the top plate assembly; a second cassette removably fastenable to the pot plate when the first cassette is removed, and comprising a second backing plate with a varying thickness and a second sliding layer mounted to the second backing plate and in slidable contact with the bottom surface of the top plate assembly; and a piston plate assembly comprising an elastomeric disc contacting a bottom surface of the pot plate and a piston plate contacting a bottom surface of the elastomeric disc.

According to another aspect of the invention, there is provided a method for servicing a bearing apparatus while supporting a structure. The bearing apparatus has a first assembly, a cassette assembly, and a second assembly. The cassette assembly is located in between the first and second assemblies and comprises a cassette housing and a first cassette removably fastened to the cassette housing. The first cassette comprises a first backing plate and a first sliding layer in sliding contact with a bottom surface of the first assembly. The method comprises: removing the first cassette from the bearing apparatus; inspecting the first sliding layer for premature and uneven wear; and replacing the first cassette with a second cassette in the bearing apparatus when premature and uneven wear is detected, the second cassette having a second sliding layer and a backing plate with a varying thickness corresponding to the uneven wear on the first sliding layer.

According to another aspect of the invention, there is provided a method for servicing a uni-directional pot bearing while supporting a structure. The uni-directional pot bearing has a top plate assembly, a cassette and pot plate assembly, and a piston assembly. The cassette and pot plate assembly comprises a pot plate and a first cassette removably fastened to the pot plate and comprising a first backing plate and first sliding layer in sliding contact with a bottom surface of the top plate assembly. The method comprises: removing the first cassette from the uni-directional pot bearing; inspecting the first sliding layer for premature and uneven wear; and replacing the first cassette with a second cassette in the uni-directional pot bearing when premature and uneven wear is detected, the second cassette having a second sliding layer and a backing plate with a varying thickness corresponding to the uneven wear on the first sliding layer.

DETAILED DESCRIPTION OF EMBODIMENTS

Embodiments disclosed herein relate generally to uni-directional or multi-directional bearings suitable for supporting structures such as bridges. These bearings include a removable cassette comprising a sliding layer composed of a low friction material, such as PTFE. The sliding layer is typically subject to wear over time, with the life of the sliding layer often significantly less than the life of the other components of the bearing. The removable cassette allows for ease of replacement of the sliding layer without the need to remove the other parts of the bearing which are typically interconnected, and which may possibly result in the need to replace the entire bearing. Replacing bearings over busy traffic ways or on bridge piers which are inaccessible from below, such as for bridges which span over rivers or deep valleys, is onerous and costly. Bearings are installed with the cassette assembly for ease of replacement of the sliding layer when needed. The replacement cassette may be manufactured with a backing plate having a varying thickness to compensate for the observed uneven wear in the original deteriorated sliding layer. In this way, the bearing installed with the new replacement cassette should perform better that the original bearing and consequentially limit wear on the new sliding layer.

Embodiments of the bearing comprise a first assembly having a top surface for supporting a superstructure; a second assembly having a bottom surface mountable on a substructure; and a cassette assembly in between the first and second assemblies. The cassette assembly comprises a cassette housing in contact with a top surface of the second assembly and a cassette removably fastened to the cassette housing. The cassette comprises a backing plate and a sliding layer mounted to the backing plate and in sliding contact with a bottom surface of the first assembly, such that the first assembly is movable relative to the second assembly along the sliding layer.

One type of uni-directional bearing is a pot bearing. According to a first embodiment and referring to FIGS. 1 to 9, there is disclosed a uni-directional pot bearing 10 wherein the first assembly is a top plate assembly 12 (shown in detail in FIG. 5), the cassette assembly is integrated with a pot plate in a cassette and pot plate assembly 14 ("pot", shown in detail in FIG. 6) and the second assembly is a piston plate assembly 16 ("piston", shown in detail in FIG. 7) in a vertically stacked arrangement. In this embodiment, the pot 114 is positioned above the piston 116; however, in other embodiments, the piston can be placed above the pot (see FIG. 9) in which case the cassette assembly is integrated into a piston plate to form a cassette and piston plate assembly 114, and the second assembly is a pot plate assembly 116.

Figure 5:
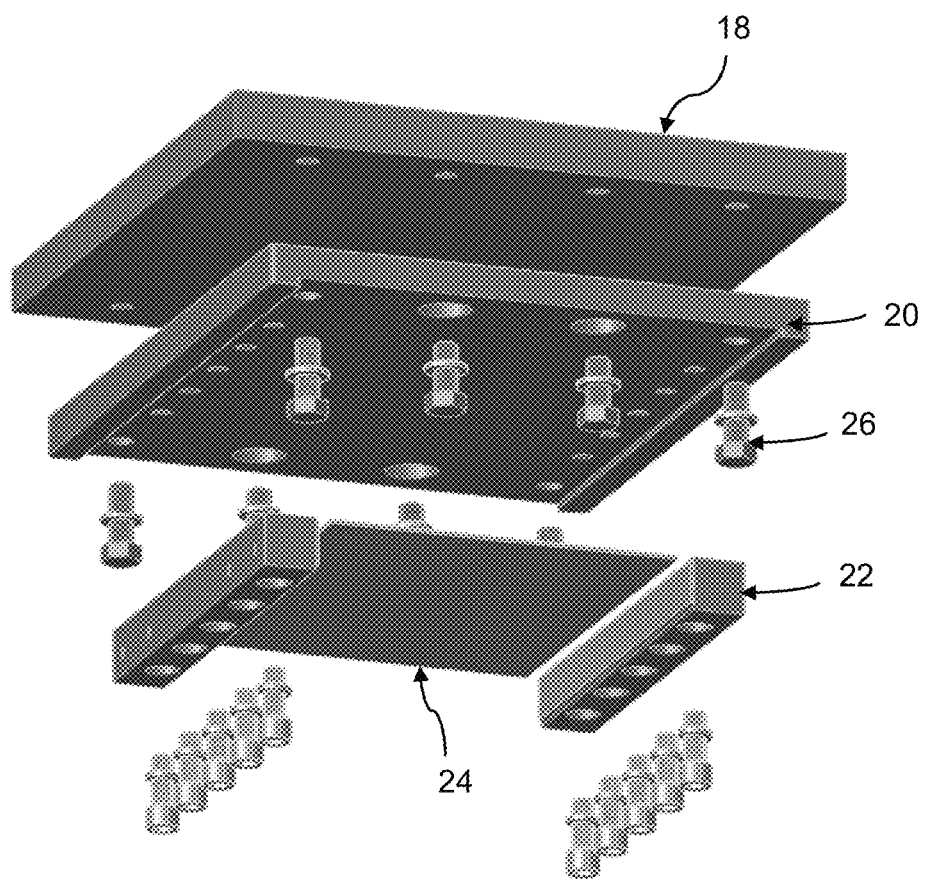
FIG. 5 is an exploded bottom perspective view of a top plate assembly of the uni-directional pot bearing.

As can be seen in FIG. 5, the top plate assembly 12 comprises a taper sole plate 18, a top plate 20, and a pair of parallel spaced guide bars 22 flanking a polished stainless-steel plate 24 welded to the underside of the top plate 20 and which serves as the main sliding surface for the bearing. The top surface of the taper sole plate 18 serves to support a bridge component (not shown) and the bottom surface of the stainless-steel plate 24 serves as a sliding surface for the cassette and pot plate assembly 14.

Figure 6:
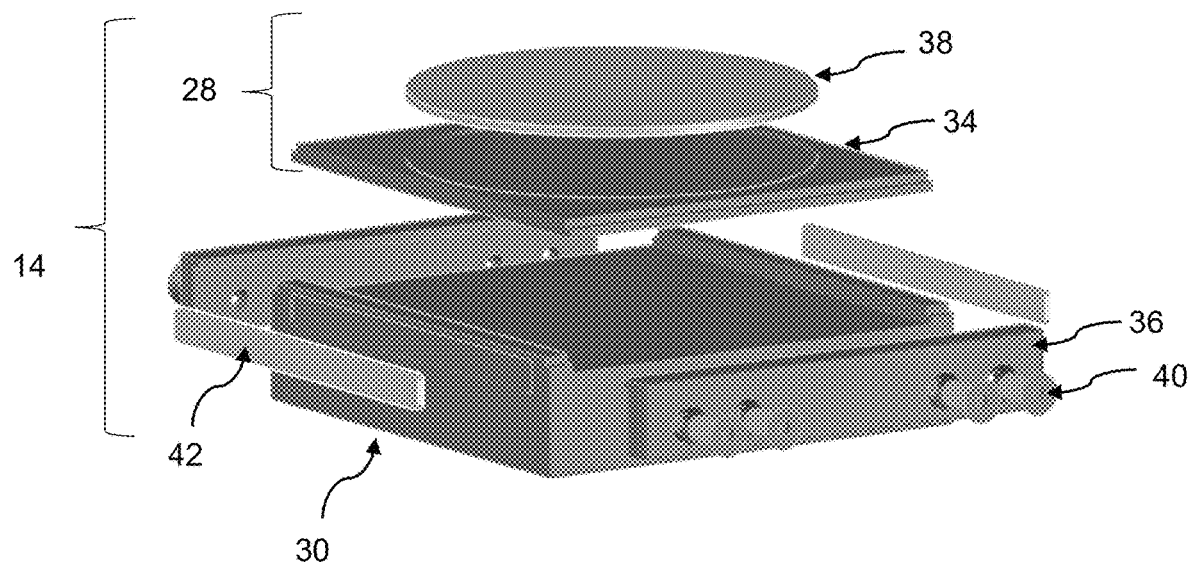
FIG. 6 is an exploded top perspective view of a cassette and pot plate assembly of the uni-directional pot bearing.

As can be seen in FIG. 6, the cassette and pot plate assembly 14 comprises a cassette 28 and a pot plate 30. The cassette 28 comprises a backing plate 34, a sliding layer 38 recessed into the backing plate 34, and two anchor plates 36 at each end of the backing plate 34 and which serves to anchor the cassette 28 and prevent it from moving out of position on top of the bearing. The sliding layer 38 in this embodiment is a dimpled PTFE disc; however, the sliding layer can have a different geometry and be composed of another similar low friction material, as is known in the art. The anchor plates 36 have bores for receiving bolts 40 for securing the cassette 28 to the pot plate 30 (or to a piston in an alternative embodiment). The required number of bores will depend on the size of the bearing being designed.

In this configuration, the pot plate 30 has a top surface with raised side edges which are spaced to receive the cassette 28. The front surface of the pot plate 30 has threaded bores aligned with the bores of the anchor plates 36 of the cassette 28, and configured to receive the bolts 40. To replace the cassette 28 ("old cassette"), the anchor plates 36 are removed and the old cassette 28, with the sliding layer 38, is pushed out from one end and replaced with a replacement cassette 60 ("new cassette", see FIGS. 8(*a*) and (*b*)) and the anchor plates 36 are re-installed to anchor the new cassette 60 into position.

Figure 7:
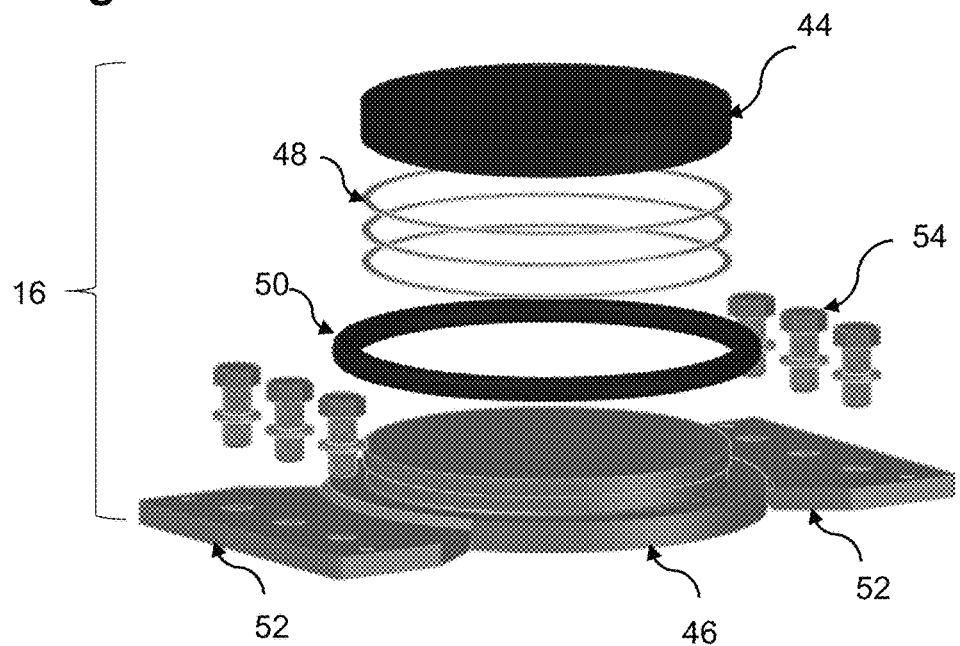
FIG. 7 is an exploded top perspective view of a piston plate assembly of the uni-directional pot bearing.
Figure 8A:
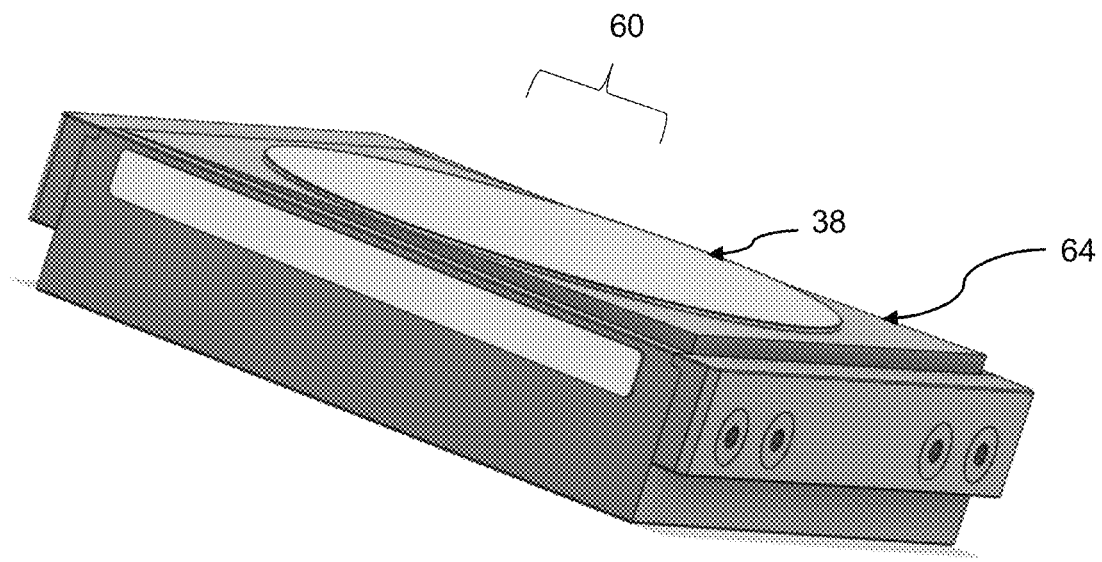
FIGS. 8(*a*) and (*b*) are two top perspective views of a replacement cassette for the uni-directional pot bearing, having a sliding layer and a backing plate of varying depth in the longitudinal and transverse directions.
Figure 8B:
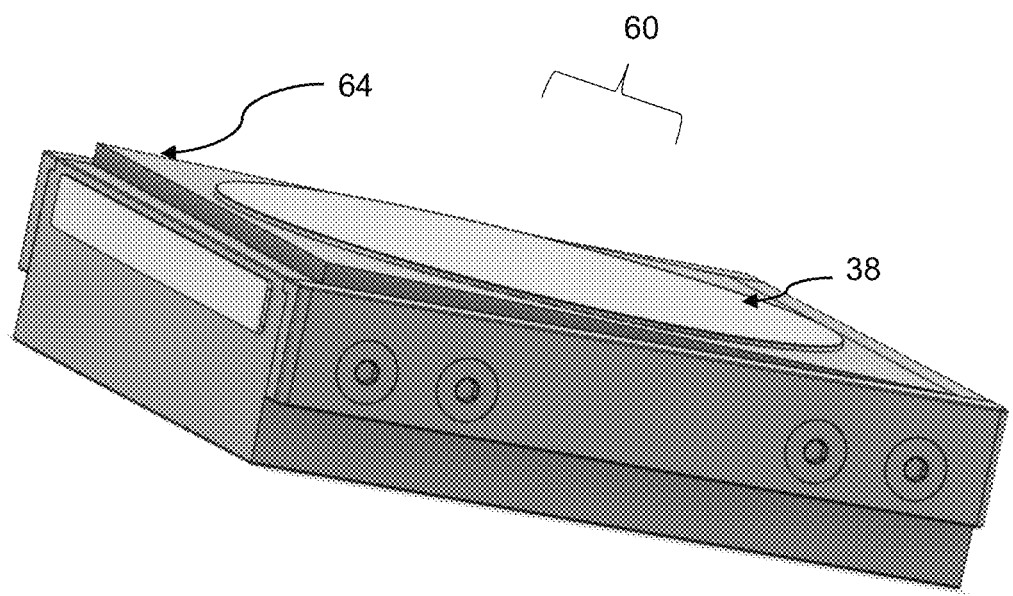

As can be seen in FIG. 7, the piston plate assembly 16 comprises an elastomeric disc 44 seated on a piston plate 46 and brass sealing rings 48 are inserted into a recess located in the elastomeric disc 44 for the pot bearing to function, allow movement and sustained load from the bridge. An annular seal 50 surrounds the piston plate 46. The pot piston plate assembly 16 is typically secured to the bridge supporting structure (not shown) such as abutments or piers by means of piston lug plates 52, anchor studs or bolts 54, and a masonry plate 56 comprising multiple anchor studs (see FIGS. 1-3).

Figure 2:
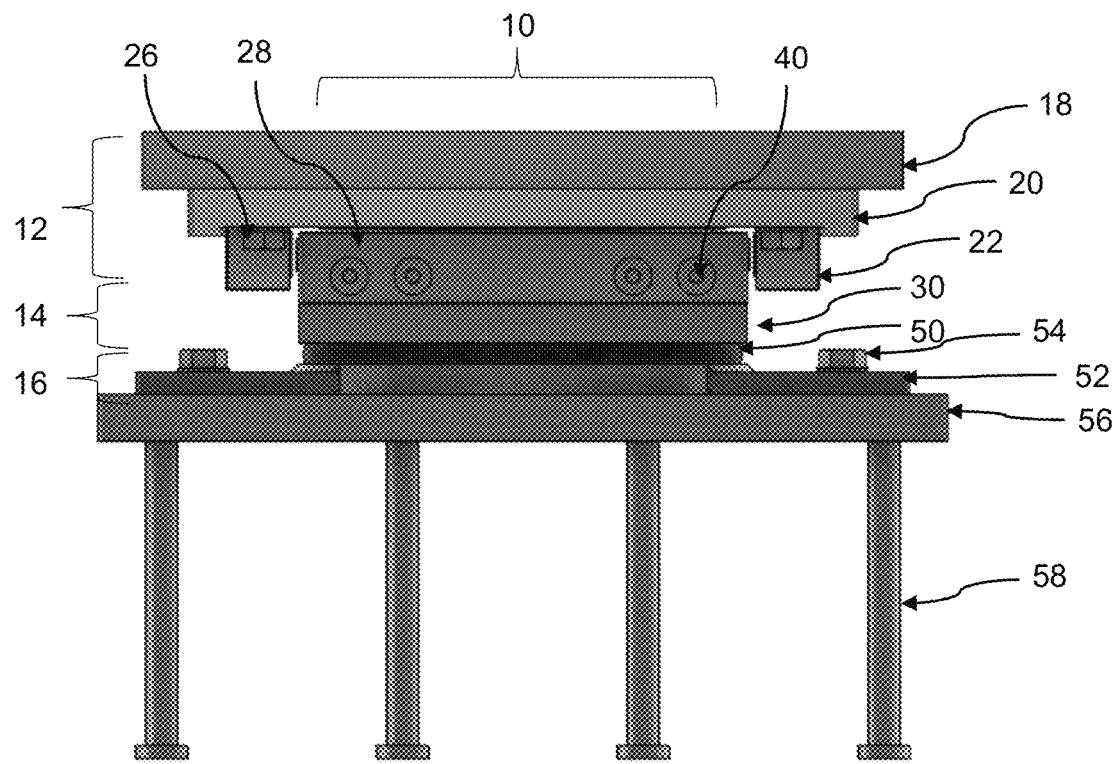
FIG. 2 is a front elevation view of the uni-directional pot bearing.
Figure 3:
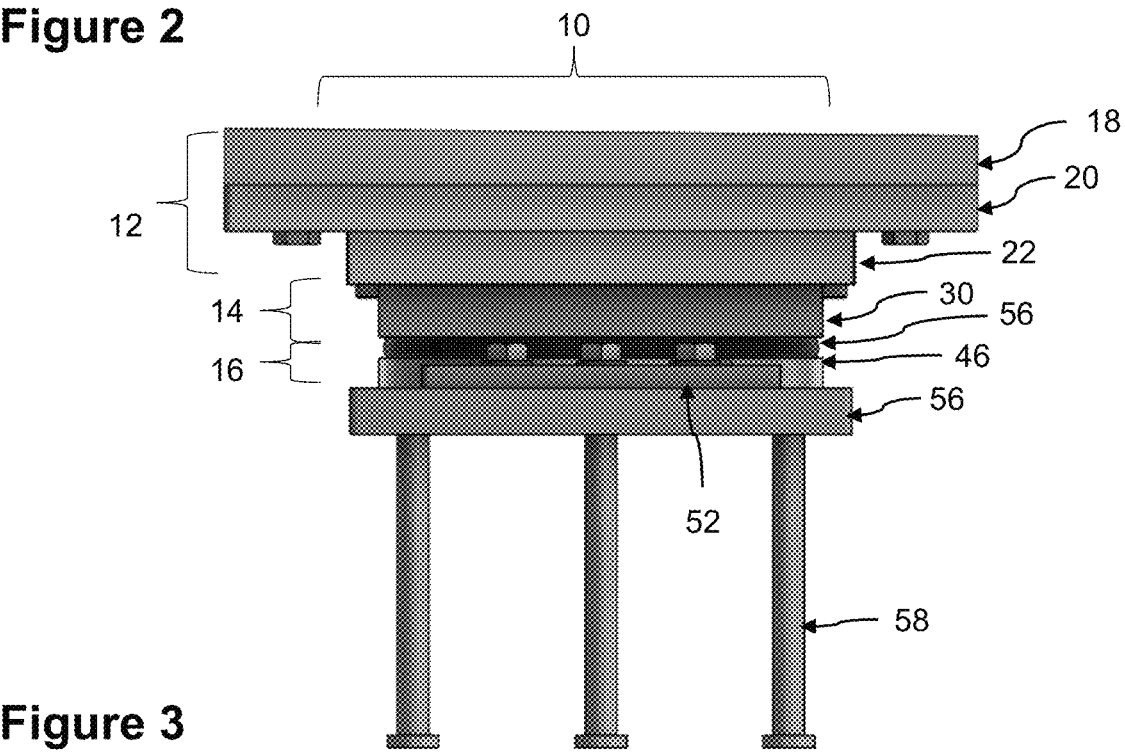
FIG. 3 is a side elevation view of the uni-directional pot bearing.
Figure 4:
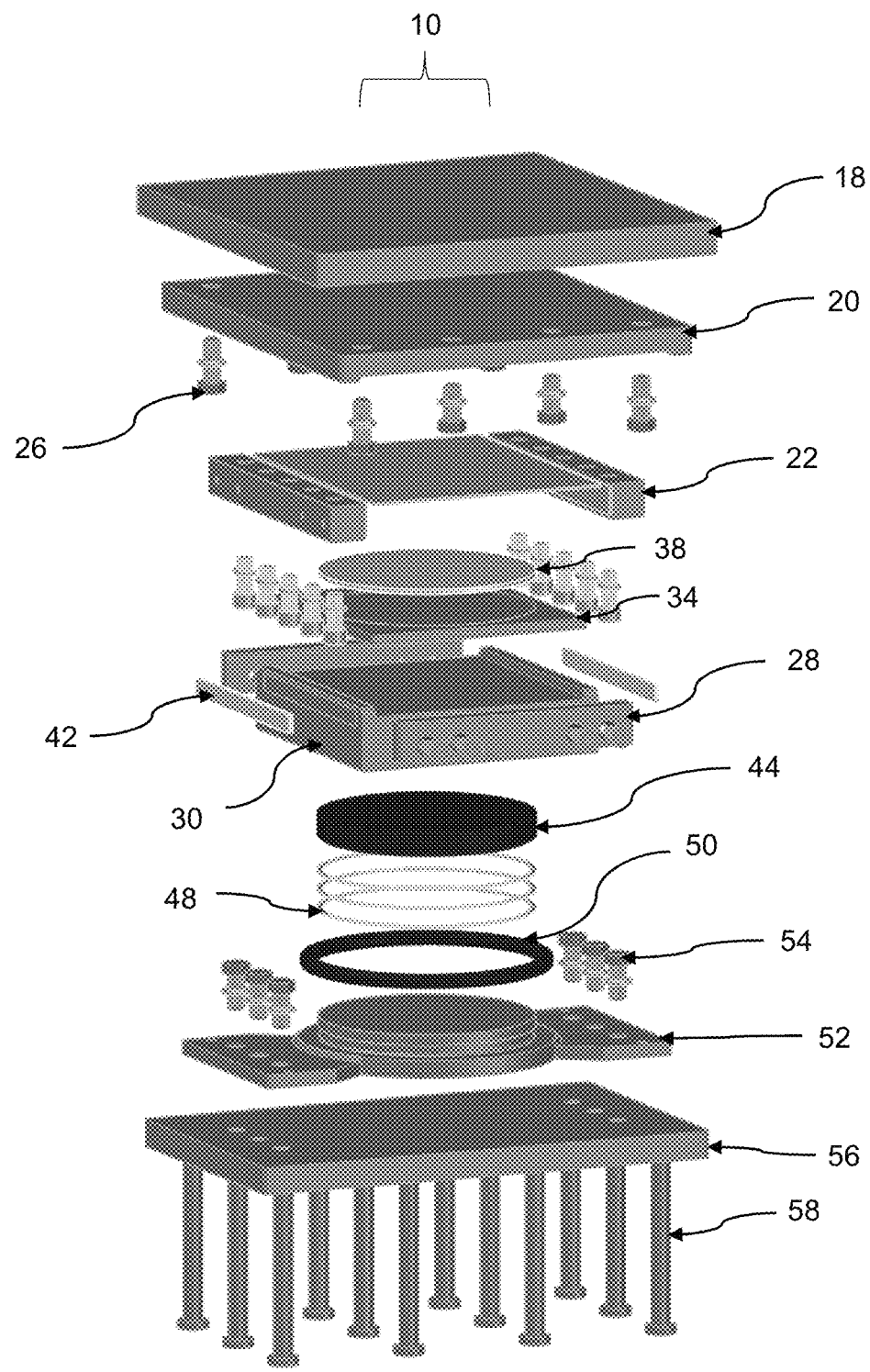
FIG. 4 is an exploded top perspective view of the uni-directional pot bearing.
Figure 9A:
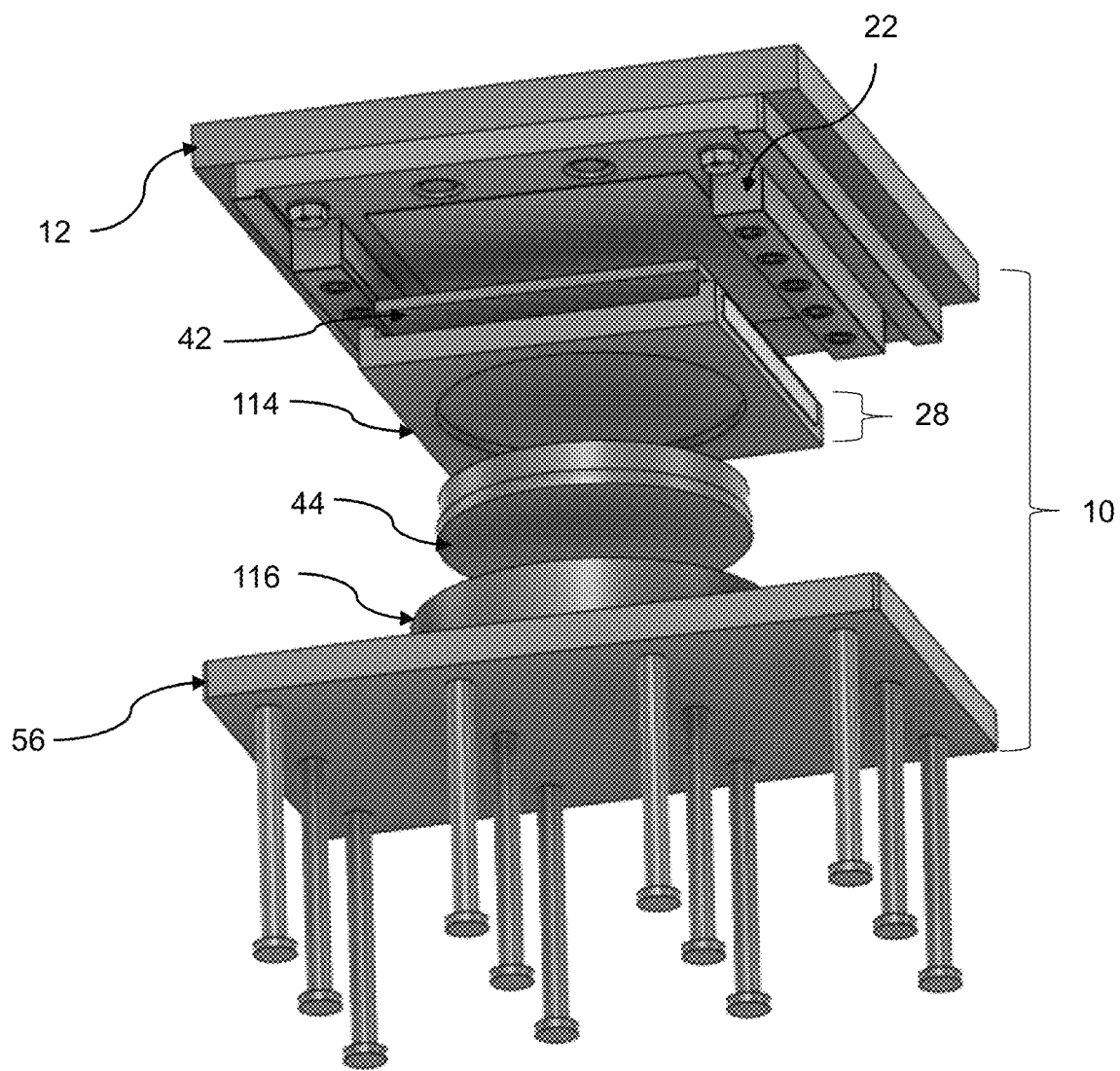
FIG. 9A is an exploded bottom perspective view of a uni-directional pot bearing according to a second embodiment of the invention.
Figure 9B:
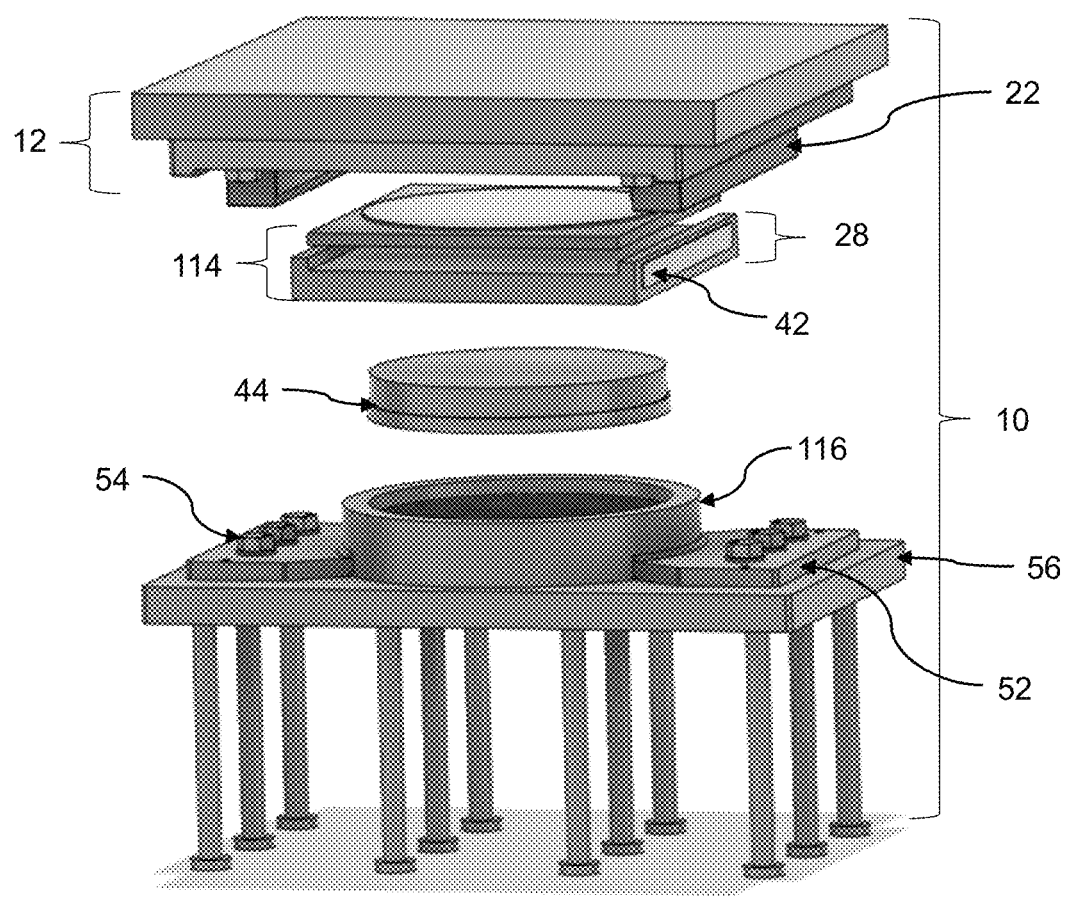
FIG. 9B is an exploded top perspective view of the uni-directional pot bearing of FIG. 9A.

Referring to FIG. 9 and according to a second embodiment, the piston and pot positions are reversed, and the cassette 28 and piston plate are integrated into a cassette and piston plate assembly 114, and the pot plate 116 is secured to the bridge supporting structure (not shown) by means of lug plates 52, anchor studs or bolts 54, and a masonry plate 56 comprising multiple anchor studs (see FIGS. 1-3). The elastomeric disc 44 is seated within a receptacle in the pot plate 116. Sliding strips 42 are mounted to side of the piston plate assembly 114 for sliding relative to the guide bars 22.

When the pot bearing 10 is installed and supporting a bridge structure, the pot bearing 10 will be designed to limit vertical translation as much as possible, but allow limited lateral translation, and allow limited horizontal and vertical axes rotation between the bridge structure and the underlying supporting structure. In the case of a pot bearing, loads and forces generated through designed restraint to movements are transferred through the piston plate 46 and elastomeric disc 44 to the pot base and walls 30. Additionally, the cassette and pot plate assembly 14 and the piston plate assembly 16 are laterally translatable relative to the top plate assembly 12 by means of the sliding layer 38 sliding relative to the stainless-steel plate 24 and the sliding strips 42 sliding relative to the guide bars 22. Finally, the top plate assembly 12 and cassette and pot plate assembly 14 are rotatable about the vertical and horizontal axes relative to the piston plate assembly 16 by means of the elastomeric disc 44 deforming about a vertical axis (rotation about the vertical axis) and deforming about a horizontal axis (rotation about a horizontal axis) by compressing at one edge and expanding at an opposite edge.

As noted above, over time the sliding layer 38 may wear prematurely relative to the other components of the pot bearing 10, and the premature wear may be uneven. When premature wear is detected, the pot bearing 10 can be serviced in the same way as conventional pot bearings, i.e. by jacking up the bridge component to remove the vertical load on the pot bearing 10. However, unlike conventional pot bearings which more than likely will need to be entirely removed, only the cassette 28 of the bearing 10 is removed, by removing bolts 40, the anchor plates 36, and removing the cassette 28. The sliding layer 38 can then be inspected for wear. If the wear on the sliding layer 38 is uneven, for example, is more pronounced at one edge than another edge, this suggests that there is persistent uneven pressure on the uni-directional pot bearing 10 that would cause a similar uneven wear on a replacement sliding layer. To mitigate against such uneven wear and referring to FIGS. 8(*a*) and (*b*), a replacement cassette 60 with a new sliding layer 38 can be provided having a backing plate 64 of variable thickness to overcome the out-of-tolerance measured. That is, the backing plate 64 is designed to be thicker at the location where greater wear was found in the original cassette 28 and thinner where less wear was found in the original cassette 28.

In another embodiment, a kit can be provided featuring the uni-directional pot bearing 10 having multiple cassettes, including the original cassette 28, and one or more replacement cassettes (not shown) each with a different varying thickness profile.

Once the replacement cassette 60 is made or selected from the kit, it is inserted back into the uni-directional pot bearing 10, and the jacks are removed. It is expected that the replacement cassette 60 will be less prone to premature wear compared to the original cassette 28, since the varying thickness profile will match the uneven wear caused by the eccentric loading on the pot bearing 10.

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

It is contemplated that any part of any aspect or embodiment discussed in this specification can be implemented or combined with any part of any other aspect or embodiment discussed in this specification.

The scope of the claims should not be limited by the preferred embodiments set forth in the examples but should be given the broadest interpretation consistent with the description as a whole.

What is claimed is:

1. A bearing apparatus for supporting a structure, comprising:
   (a) a first assembly having a top surface for supporting a superstructure;
   (b) a second assembly having a bottom surface mountable on a substructure; and
   (c) a cassette assembly in between the first and second assemblies, and comprising
      a cassette housing in contact with a top surface of the second assembly, and
      a cassette removably fastened to the cassette housing and being slidably removable from the cassette housing while the cassette housing remains in between the first and second assemblies, the cassette comprising a backing plate and a sliding layer mounted to the backing plate and in sliding contact with a bottom surface of the first assembly, such that the first assembly is movable relative to the second assembly along the sliding layer.

2. The apparatus as claimed in claim 1 wherein the bearing is a pot bearing,
   wherein the first assembly is a top plate assembly comprising at least one guide bar extending in a lateral sliding direction,
   wherein the cassette housing is a pot plate in sliding contact with the guide bar along a lateral sliding direction,
   wherein the second assembly is a piston plate assembly comprising an elastomeric disc contacting a bottom surface of the pot plate, and a piston plate contacting a bottom surface of the elastomeric disc, and
   wherein the piston plate assembly is rotatable about vertical and horizontal axes relative to the cassette assembly by deformation of the elastomeric disc.

3. The apparatus as claimed in claim 2 wherein the backing plate has a varying thickness across two or more corners of the backing plate.

4. The apparatus as claimed in claim 3 wherein the varying thickness of the backing plate corresponds to an observed wear in the sliding layer from a varying pressure on the sliding layer caused by an eccentric load or over rotation of the bearing apparatus.

5. The apparatus as claimed in claim 2 wherein the pot plate further comprises a sliding strip in sliding contact with the guide bar.

6. The apparatus as claimed in claim 5 wherein the sliding layer and sliding strip are composed of polytetrafluoroethylene (PTFE).

7. The apparatus as claimed in claim 2 wherein the cassette assembly further comprises two anchor plates securing the cassette in place when the two anchor plates are attached to ends of the pot plate and allowing the cassette to be removed from the apparatus when at least one anchor plate is detached from the pot plate.

8. The apparatus as claimed in claim 1 wherein the bearing is a pot bearing,
   wherein the first assembly is a top plate assembly comprising at least one guide bar extending in a lateral sliding direction;
   wherein the cassette housing is a piston plate in sliding contact with the guide bar along a lateral sliding direction,
   wherein the second assembly is a pot plate assembly comprising an elastomeric disc contacting a bottom surface of the piston plate; and a pot plate contacting a bottom surface of the elastomeric disc, and
   wherein the pot plate assembly is rotatable about vertical and horizontal axes relative to the cassette assembly by deformation of the elastomeric disc.

9. The apparatus as claimed in claim 8 wherein the backing plate has a varying thickness across two or more corners of the backing plate.

10. The apparatus as claimed in claim 9 wherein the varying thickness of the backing plate corresponds to an observed wear in the sliding layer from a varying pressure on the sliding layer caused by an eccentric load or over rotation of the bearing apparatus.

11. The apparatus as claimed in claim 8 wherein the pot plate further comprises a sliding strip in sliding contact with the guide bar.

12. The apparatus as claimed in claim 11 wherein the sliding layer and sliding strip are composed of polytetrafluoroethylene (PTFE).

13. The apparatus as claimed in claim 8 wherein the cassette assembly further comprises two anchor plates securing the cassette in place when the two anchor plates are attached to ends of the pot plate and allowing the cassette to be removed from the apparatus when at least one anchor plate is detached from the pot plate.

* * * * *